US008179577B2

(12) United States Patent
Roichman et al.

(10) Patent No.: US 8,179,577 B2
(45) Date of Patent: May 15, 2012

(54) THREE-DIMENSIONAL HOLOGRAPHIC RING TRAPS

(75) Inventors: Yohai Roichman, New York, NY (US); David G. Grier, New York, NY (US)

(73) Assignee: New York University, New York, NY (US)

( * ) Notice: Subject to any disclaimer, the term of this patent is extended or adjusted under 35 U.S.C. 154(b) by 1029 days.

(21) Appl. No.: 11/923,476

(22) Filed: Oct. 24, 2007

(65) Prior Publication Data

US 2008/0137161 A1    Jun. 12, 2008

Related U.S. Application Data

(60) Provisional application No. 60/853,936, filed on Oct. 24, 2006.

(51) Int. Cl.
*G03H 1/00*       (2006.01)
*G02B 5/32*       (2006.01)
*H01S 1/00*       (2006.01)
(52) U.S. Cl. .............................. 359/1; 359/15; 250/251
(58) Field of Classification Search ................ 359/1, 15; 250/251
See application file for complete search history.

(56) References Cited

U.S. PATENT DOCUMENTS 7,109,473 B2 *   9/2006   Grier et al. .................... 250/251

OTHER PUBLICATIONS

Arlt et al., "Generation of a Beam with a Dark Focus Surrounded by Regions of Higher Intensity: The Optical Bottle Beam", Feb. 15, 2000, pp. 191-193, vol. 25, No. 4, *Optics Letters*, Optics Society of America.
Curtis et al., "Dynamic Holographic Optical Tweezers", Jun. 15, 2002, pp. 169-175, *Optics Communications 207*, Elsevier Science B.V.
Curtis et al., "Structure of Optical Vortices", Apr. 3, 2003, pp. 133901-1-133901-4, vol. 90, No. 13, *Physical Review Letters*, The American Physical Society.
Curtis et al., "Modulated Optical Vortices", Jun. 1, 2003, pp. 872-874, vol. 28, No. 11, *Optics Letters*, Optics Society of America.
Gahagan et al., "Optical Vortex Trapping of Particles", Jun. 1, 1996, pp, 827-829, vol. 21, No. 11, *Optics Letters*, Optics Society of America.
Gahagan et al., "Trapping of Low-Index Microparticles in an Optical Vortex", Feb. 1998, pp. 524-534, vol. 15, No. 2, *J. Opt. Soc. Am. B*, Optical Society of America.
Gahagan et al., "Simultaneous Trapping of Low-Index and High-Index Microparticles Observed with an Optical-Vortex Trap", Apr. 1999, pp. 533-537, vol. 16, No. 4, *J. Opt. Soc. Am. B*, Optical Society of America.
Guo et al., "Optimal Annulus Structures of Optical Vortices", Sep. 20, 2004, pp. 4625-4634, vol. 12, No. 19, *Optics Express*, Optics Society of America.
He et al., "Direct Observation of Transfer of Angular Momentum to Absorptive Particles from a Laser Beam with a Phase Singularity", Jul. 31, 1995, pp. 826-829, vol. 75, No. 5, *Physical Review Letters*, The American Physical Society.

(Continued)

*Primary Examiner* — Jade R Chwasz
(74) *Attorney, Agent, or Firm* — Foley & Lardner LLP

(57) ABSTRACT

A method and system for preparing and using three dimensional optical ring traps. The method and system includes applying a single phase hologram to be able to independently control shape and force profile of an optical trap but without employing orbital angular momentum for the control parameter of an optical ring trap to manipulate an object.

20 Claims, 4 Drawing Sheets

OTHER PUBLICATIONS

He et al., "Optical Particle Trapping with Higher-Order Doughnut Beams Produced Using High-Efficiency Computer Generated Holograms", 1995, pp. 217-223, vol. 42, No. 1, *Journal of Modern Optics*, Taylor & Francis Ltd.

Ladavac et al., "Colloidal Hydrodynamic Coupling in Concentric Optical Vortices", May 15, 2005, pp. 548-554, vol. 70, No. 4, *Europhys. Lett.* EDP Sciences.

Ladavac et al., "Microoptomechanical Pumps Assembled and Driven by Holographic Optical Vortex Arrays", Mar. 22, 2004, pp. 1144-1149, vol. 12, No. 6, *Optics Express*, Optics Society of America.

Lee et al., "Robustness of Holographic Optical Traps Against Phase Scaling Errors", Sep. 19, 2005, pp. 7458-7465, vol. 13, No. 19, *Optics Express*, Optics Society of America.

Liesener et al., "Multi-Functional Optical Tweezers Using Computer-Generated Holograms", Nov. 1, 2000, pp. 77-82, *Optics Communications 185*, Elsevier Science B.V.

Polin et al., "Optimized Holographic Optical Traps", Jul. 25, 2005, pp. 5831-5845, vol. 13, No. 15, *Optics Express*, Optics Society of America.

Roichman et al., "Optical Traps with Geometric Aberrations", May 20, 2006, pp. 3425-3429, vol. 45, No. 15, *Applied Optics*, Optics Society of America.

Roichman et al., "Projecting Extended Optical Traps with Shape-Phase Holography", Jun. 1, 2006, pp. 1675-1677, vol. 31, No. 11, *Optics Letters*, Optics Society of America.

Simpson et al., "Optical Tweezers and Optical Spanners with Laguerre-Gaussian Modes", 1996, pp. 2485-2491, vol. 43, No. 12, *Journal of Modern Optics*, Taylor & Francis Ltd.

Sundbeck et al., "Structure and Scaling of Helical Modes of Light", Mar. 1, 2005, pp. 477-479, vol. 30, No. 5, *Optics Letters*, Optics Society of America.

* cited by examiner

THREE-DIMENSIONAL HOLOGRAPHIC RING TRAPS

CROSS-REFERENCE TO RELATED PATENT APPLICATIONS

This application claims benefit under 35 USC 119(e) of U.S. Application No. 60/853,936 filed Oct. 24, 2006, incorporated by reference in its entirety.

The U.S. Government has certain rights in this invention pursuant to grants from the National Science Foundation by Grants Number DMR-0451589 and DBI-0629584.

This invention is directed to a method and system for preparing and using three dimensional (3D) holographic optical ring traps. More particularly, the invention is directed to use of a new class and type of diffractive optical elements for use in holographic optical trapping system to project ring-like optical traps. These traps, unlike optical vortex traps which include orbital angular momentum, implement their trapping via a force-free, one dimensional potential energy well for manipulation and control of small objects.

BACKGROUND OF THE INVENTION

Systems and methods have been recently developed for the widespread use of optical traps or tweezers. Such tweezers have become indispensable in a wide range of uses for manipulation and separation of many varieties and sizes of small objects. The fields of use include the biosciences, micro-sized machines, optical applications, and even selected chemical processing systems. However, current optical traps and their configurations are limiting their use and preventing successful small scale system operation due to inefficient and even ineffective trapping characteristics and lack of independent control over a trap's shape and force profiles.

SUMMARY OF THE INVENTION

In view of the above-recited deficiencies and shortcomings the present invention provides a 3D optical ring trap which has substantial degrees of freedom and precision in preparing a desired trap shape and force profile, allowing greatly improved manipulation, separation and movement of small objects, such as allowing precise movement of objects along closed trajectories in 3D. The subject invention creates optical traps which resemble optical vortices, but enable much improved trapping characteristics and independent control over the trap's shape and precision in establishing force profiles. The ring traps do not carry orbital angular momentum, but in selected applications such momentum can be included for particular uses.

Various aspects of the invention are described hereinafter; and these and other improvements are described in greater detail below, including the drawings described in the following section.

DETAILED DESCRIPTION OF PREFERRED EMBODIMENTS

Figure 1A:
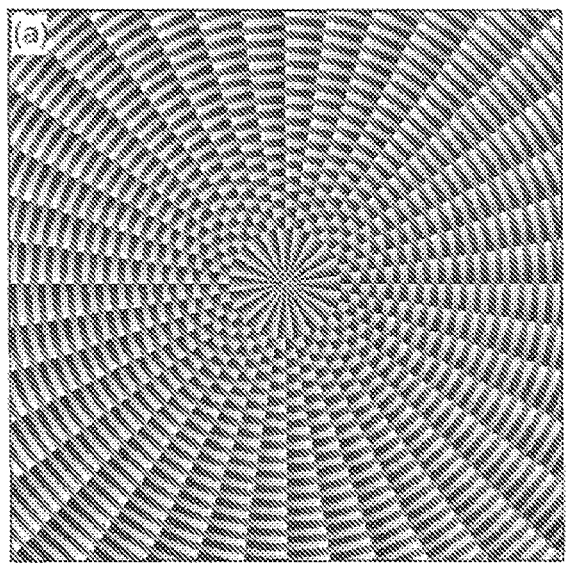
FIG. 1A illustrates the phase profile $\Phi(\rho)$ for a shape phase hologram encoding a ring trap with radius R=6 µm and having a topological charge l=20.

Optical tweezers have become indispensable tools for research and development in biology, physics, chemistry and engineering. Typically formed by focusing a Gaussian laser beam with a high-numerical-aperture lens, they excel at manipulating micrometer-scale objects. This invention embodies a new class of ring-like optical traps created with shape-phase holography and the holographic optical trapping technique that can move microscopic objects along closed trajectories in three dimensions. Holographic ring traps broadly resemble optical vortices but feature qualitatively better trapping characteristics and independent control over the trap's shape and force profiles. This flexibility creates new opportunities for fundamental research, materials processing and micro-opto-mechanics.

An optical vortex is created by focusing a helical mode of light, whose field, $$\psi(\rho)=u_0(\rho)e^{il\theta} \qquad (1)$$

is characterized by the integer-valued winding number l. Here, $\rho=(\rho, \theta)$ is the polar coordinate relative to the optical axis, and $u_0(\rho)$ is a real-valued radially symmetric amplitude profile. In many conventional implementations, $u_0(\rho)$ is a Gaussian and the helical phase profile is imposed by a mode converter, such as a phase-only hologram. A helical beam focuses to a ring of radius $R_l \propto l$ because destructive interference along the beam's central screw dislocation suppresses its axial intensity. Objects in an optical vortex experience a torque because each photon in a helical beam carries orbital angular momentum $l\hbar$. These properties provide the basis for a wide range of applications. Despite their utility, optical vortices' performance can be qualitatively improved by applying scalar diffraction theory. The result is a new class of highly effective and flexible holographic ring traps.

An optical ring trap in the focal plane of a lens of focal length f is characterized by its radius, R, its azimuthal amplitude profile, $a(\Phi)$, and its azimuthal phase profile, $\eta(\Phi)$. The associated field in the lens' input plane is given by the Fresnel transform $$\psi(\rho) = \int \frac{d^2r}{f\lambda} a(\phi)\delta(r-R)e^{i\eta(\phi)} \exp\left(i\frac{\pi}{\lambda f}r\cdot\rho\right), \qquad (2)$$

where λ is the wavelength of light, and where we have dropped irrelevant phase terms. Integrating over the radial coordinate r yields $$\psi(\rho) = \frac{R}{f\lambda} \int_0^{2\pi} d\phi a(\phi) e^{i\eta(\phi)} \exp\left(i\frac{\pi}{\lambda f} R\rho\cos(\phi - \theta)\right) \quad (3)$$

Substituting $a(\Phi)=1$ and $\eta(\Phi)=l\Phi$ to create a uniform ring carrying orbital angular momentum yields $$\psi(\rho)=\psi_0 J_l(k\rho)e^{il\theta}, \quad (4)$$

where $k=\pi R/(\lambda f)$ and $J_l(k\rho)$ is the l-th order Bessel function of first kind.

A hologram transforming a Gaussian beam into a ring trap would have to modify both the amplitude and phase of the incident light according to Eq. (4). The field's amplitude, however, depends only on ρ, and its phase depends only on Φ. This separation into two linearly independent one-dimensional functions lends itself to implementation as a phase-only hologram by shape-phase holography as described herein. When implemented in polar coordinates, the shape-phase hologram for a ring trap takes the form $$\phi_{SP}(\rho)=S(\rho)\phi(\rho)+[1-S(\rho)]q(\rho), \quad (5)$$

where $$\phi(\rho)=[l\theta+\pi H(-J_l(k\rho))] \bmod 2\pi, \quad (6)$$

is the phase of $\psi(\rho)$ from Eq. (4), incorporating the Heaviside step function, H(x), to ensure that the amplitude profile, $u(\rho)=|J_l(k\rho)|$, is non-negative. The binary shape function, $S(\rho)$, approximates the continuous variations in $u(\rho)$ by assigning an appropriate number of pixels to $\phi_{SP}(\rho)$ at radial coordinate, ρ. The unassigned pixels are given values from a second hologram, $q(\rho)$, that diverts the extraneous light.

Some latitude remains in selecting the shape function. For holographic line traps, it can be adjusted to minimize intensity variations due to Gibbs phenomenon. For a uniform ring trap, $S(\rho)$ may be selected randomly with probability $P(S(\rho)=1)=|J_l(k\rho)|/J_l(x_l)$, where $x_l$ is the location of the first maximum of $J_l(x)$. The angular distribution of pixels in $S(\rho)$ also may be selected to fine-tune the intensity profile around the ring.

Figure 1B:
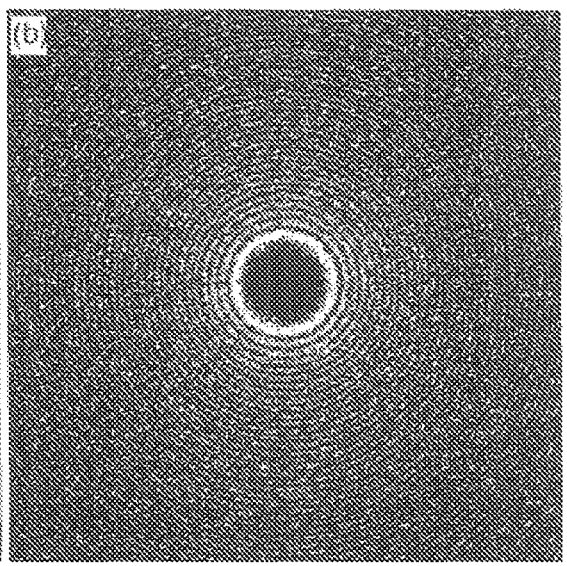
FIG. 1B illustrates the associated shape function of FIG. 1A selected probabailistically.
Figure 2A:
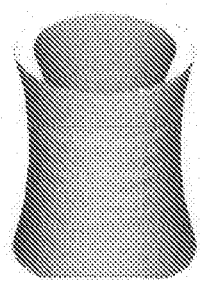
FIG. 2A illustrates an optical vortex profile in 3D with l=60.
Figure 2B:
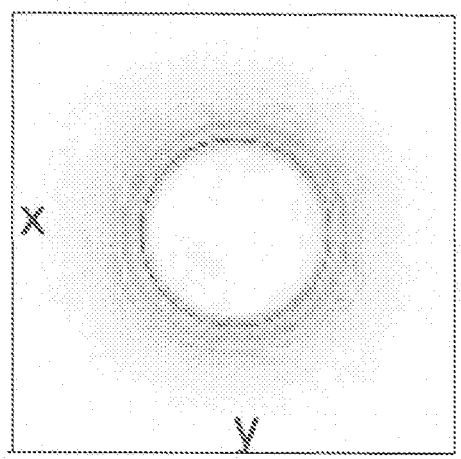
FIG. 2B illustrates the intensity in an x-y plane at the longitudinal center of the profile of FIG. 2A (the scale bar indicate 5 µm)
Figure 2C:
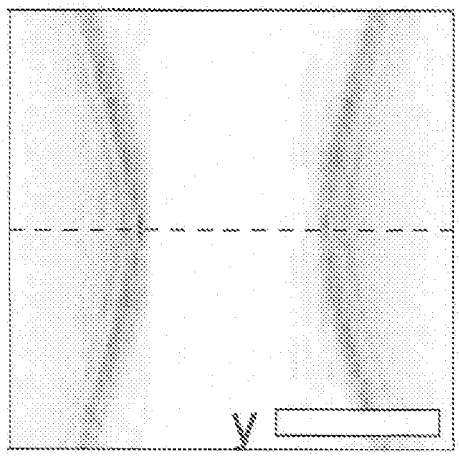
FIG. 2C illustrates the intensity profile on a y-z plane along the longitudinal axes and FIG. 2D illustrates the intensity profile on an x-z plane along the longitudinal axis.
Figure 2D:
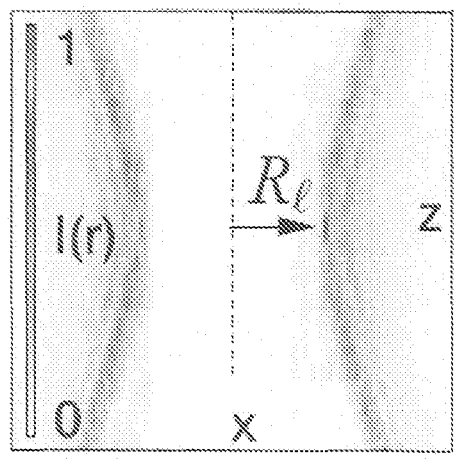
Figure 3A:
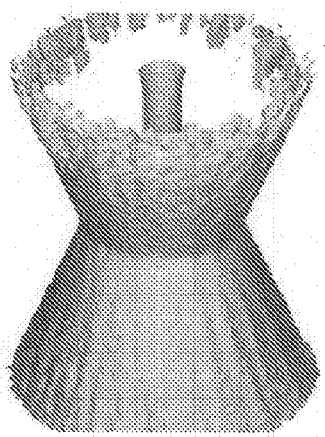
FIG. 3A illustrates an optical vortex profile in 3D with R=3 µm and l=20.
Figure 3B:
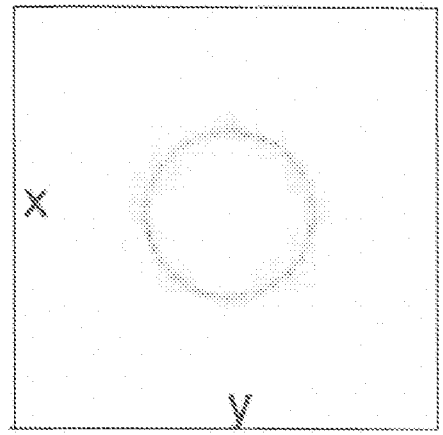
FIG. 3B illustrates the intensity in an x-y plane at the longitudinal center of the profile of FIG. 3A (the scale bar indicate 5 µm)
Figure 3C:
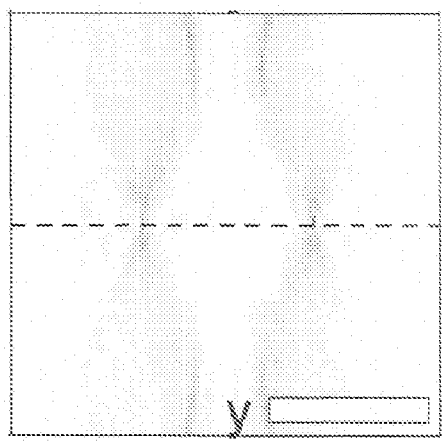
FIG. 3C illustrates the intensity profile on a y-z plane along the longitudinal axes and FIG. 3D illustrates the intensity profile on an x-z plane along the longitudinal axis.
Figure 3D:
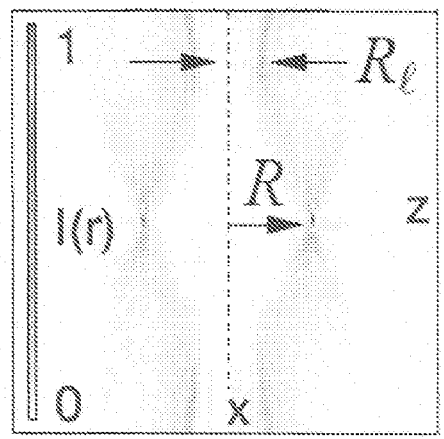

Typical results are shown in FIGS. 1A and 1B. The phase pattern's radial rings result from sign changes in $J_l(k\rho)$ and determine the trap's radius independent of l. In practice, $\Phi(\rho)$ projects a very effective ring trap even without amplitude modulation. The shape function suppresses higher diffraction orders at larger radii by eliminating contributions from pixels near the optical axis. The shape-phase hologram of the invention decouples the ring's radius from its topological charge without reducing diffraction efficiency. One advantageous consequence is that holographic ring traps need not carry orbital angular momentum, although for selected applications, such momentum can be added to carry out particular processes.

The three-dimensional intensity distribution projected by Eqs. (5) and (6) is plotted in FIGS. 2A-2D and 3A-3D are carried out in a conventional manner by calculation of Fresnel transformations of their respective phase only holograms. Note that for FIGS. 2A and 3A the bottom and/or top sections are artificially truncated; but the actual topology continues in a smooth manner to form continuous smooth arcs. These data demonstrate another substantial benefit of holographic ring traps. Because an optical vortex's radius reflects its wavefronts' topology, its radius, $R_l$, does not vary substantially as the beam is brought to a focus. Without axial intensity gradients to compensate radiation pressure, optical vortices typically cannot trap objects in three dimensions unless a surface or other external force prevents their escape. Holographic ring traps, by contrast, converge to a diffraction-limited focus for $R > R^l$, and thus are true three-dimensional traps.

Figure 4A:
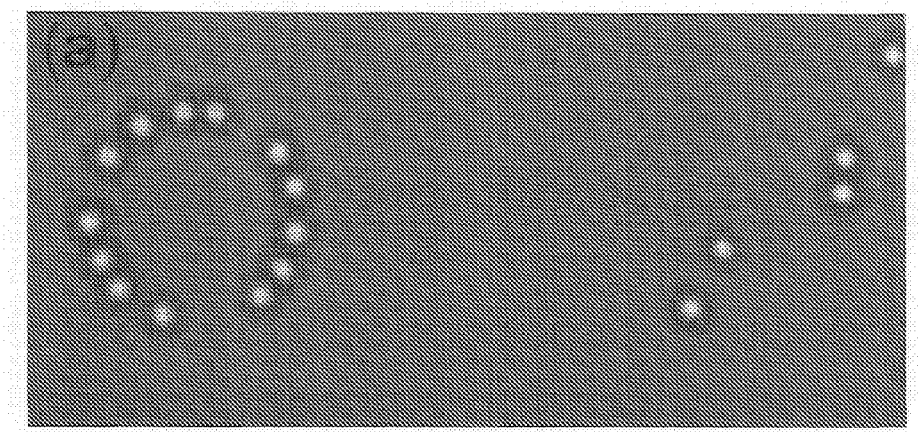
FIG. 4A illustrates colloidal silica spheres 1.5 µm in diameter captured and translated in 3D by a holographic optical ring trap with the ring trap focused into the spheres' equilibrium plane.
Figure 4B:
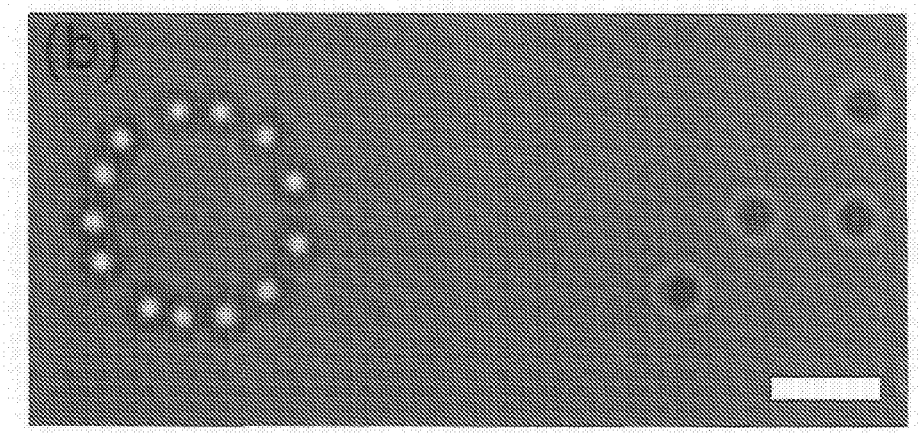
FIG. 4B like FIG. 4A but the ring of spheres is translated upward by $\Delta z=10$ µm, leaving the sedimented spheres in a lower plane (the scale bar is 5 µm)

The images in FIGS. 4A and 4B show a ring trap translating micrometer-scale colloidal spheres in three dimensions. These particles are dispersed in a layer of water 40 μm thick between a glass coverslip and a microscope slide. The sample is mounted on the stage of an inverted optical microscope (Nikon TE-2000U), with the coverslip downward. The dense silica spheres sediment onto the lower surface, where they diffuse freely. When the trap is focused into the spheres' equilibrium plane, FIG. 4A, trapped spheres have the same bright appearance as nearby free spheres. Mechanically translating the focal plane upward by $\Delta_z=10$ μm translates the trapped spheres, but leaves the free spheres behind. The trapped spheres consequently remain in focus, while the others blur. All the while, the trapped spheres circulate around the ring at a rate determined by l, the intensity of the light and the distance from the glass surface.

A holographic ring trap also can be translated in three dimensions by adding $$\varphi_t(\rho) = S(\rho)\left(\kappa \cdot \rho + \frac{\pi \rho^2 z}{\lambda f^2}\right) \quad (7)$$

to $\phi(\rho)$. Here K is the wavevector describing the in-plane translation, and z is the axial displacement. Phase functions correcting for geometric aberrations also can be added to $\phi(\rho)$ to improve performance. Superimposing the ring's phase function on a conventional holographic trapping pattern creates an array of identical ring traps. Integrating it into the hologram computation yields heterogeneous patterns of rings and other traps. Arrays of ring traps can create dynamically reconfigurable microfluidic systems and constitute model systems for nonequilibrium statistical physics.

Orbital angular momentum displaces light away from the axis of a ring trap, as can be seen in FIGS. 3A-3D. Setting l=0 creates diffractionless Bessel beams above and below the ring that terminate at a dark volume around the focus. This light-free volume acts as an optical bottle, for dark-seeking objects. Unlike previously reported bottle beams, a plurality of ring-bottles can be projected in arbitrary patterns and sizes. Holographic ring traps can also be sculpted into shapes other than circles by setting $R=R(\Phi)$, in Eq. (3). Unlike modulated optical vortices whose local intensity varies inversely with radius, modulated holographic ring traps can have independently specified intensity profiles.

Figure 5:
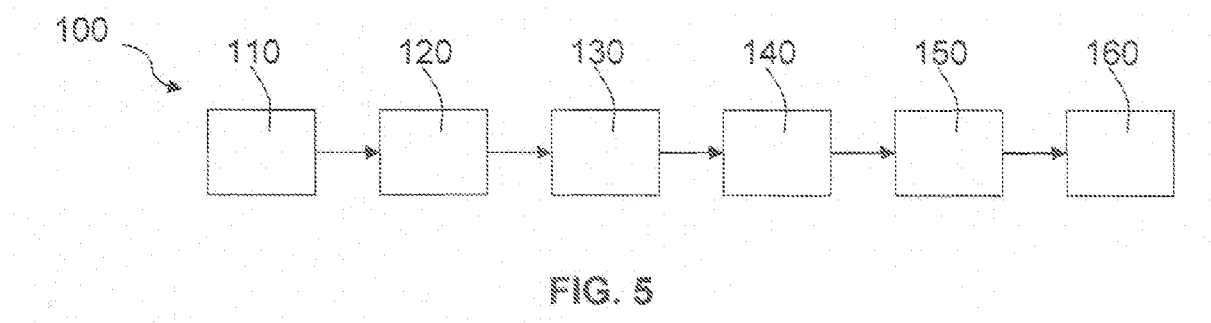
FIG. 5 is a functional block flow diagram showing creation of a hologram applied to a light beam to form a ring trap for manipulating an object.

In a system 100 shown schematically in FIG. 5 a device 110 (such as a spatial light modulator or diffraction grating) can be used to create a hologram 120 (as shown in FIG. 1.A.) applied to light beam 130. The hologram 120 applied to the light beam 130 can be processed by an optical train 140 to create a 3D optical ring trap 150 (shown schematically) to operate on or manipulate object 160.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments, and with various modifications, as are suited to the particular use contemplated.

What is claimed is:

1. A system for creating a three dimensional optical ring trap to manipulate an object comprising,
a source of a light beam having an optical axis;
a hologram including a component of a single phase function wherein the hologram includes components for independent control of amplitude, radius and phase profile of the optical ring trap; and
an optical train for applying the hologram to create an optical ring trap for manipulation of the object.

2. The system as defined in claim 1 wherein the optical ring trap has at least one of a non-zero radius and an orbital angular momentum and the hologram includes independent components for independent control of the at least one of the radius and the orbital angular momentum of the optical ring trap.

3. The system as defined in claim 2 wherein the orbital angular momentum is zero and the radius R of the optical ring trap is a selected non-zero size.

4. The system as defined in claim 1 further including a device for creating a hologram selected from the group consisting of a spatial light modulator and a diffraction grating.

5. The system as defined in claim 1 where the hologram includes a component for establishing trapping along an axial direction of the optical axis.

6. The system as defined in claim 5 wherein the ring trap has an amplitude dependent on a polar coordinate relative to the optical axis.

7. The system as defined in claim 1 wherein the hologram consists of a phase only hologram.

8. The system as defined in claim 1 wherein the optical trap is formed by the light beam having a field $\psi(\rho)$, $$\psi(\rho) = \frac{R}{f\lambda}\int_0^{2\pi} d\phi a(\phi)e^{in(\phi)}\exp\left(i\frac{\pi}{\lambda f}R\rho\cos(\phi-\theta)\right)$$

where,
$\rho=(p, \theta)$ is the polar coordinate relative to the optical axis;
$\theta$=polar angle;
R=radius of optical ring trap;
f=focal length;
$\lambda$=wavelength of light;
$\phi$=phase profile angle;
$n(\phi)$=azimuthal phase profile; and
$a(\phi)$=azimuthal amplitude profile.

9. The system as defined in claim 8 wherein the field $\psi(\rho)=\psi_0 J_l(k\rho)e^{il\theta}$ with $k=\pi R/\lambda f$ and $J_l(k\rho)$ is an l-th order Bessel function of first kind.

10. The system as defined in claim 9 wherein a shape function, $S(\rho)$, a binary shape function, is selected randomly with probability $P(S(\rho)=1)=|J_l(k\rho)|/J_l(x_l)$ where $x_l$ is a location of a first maximum of $J_l(x)$ and where $J_l(k\rho)$ is an l-th order Bessel function of first kind.

11. The system as defined in claim 9 wherein the single phase function is modified by changing a sign of $J_l(k\rho)$, where $J_l(k\rho)$ is an l-th order Bessel function of first kind.

12. The system as defined in claim 8 wherein the ring trap can be formed into a shape other than a circle, wherein $R=R(\phi)$.

13. The system as defined in claim 1 wherein the hologram comprises in polar coordinates, $\phi_{SP}(\rho)=S(\rho)\phi(\rho)+[1-S(\rho)]q(\rho)$ where
SP=shape phase;
$S(\rho)$-binary shape function;
$q(\rho)$=second hologram;
$\phi(\rho)$=phase profile; and
$\theta$=polar angle $\phi(\rho)=[l\theta+\rho H(-J_l(k\rho))] \mod 2\pi$ where,
$\rho=(p, \theta)$ is the polar coordinate;
l=integer-valued winding number;
H=Heavyside step function;
$J_l$=lth order Bessel function of first kind; and
$k=\pi R/\lambda f$.

14. The system as defined in claim 13 further including adding a phase hologram function, $$\varphi_t(\rho) = S(\rho)\left(\kappa\cdot\rho + \frac{\pi\rho^2 z}{\lambda f^2}\right)$$

where $\kappa$ is a wave vector describing a plane translation and z is axial displacement, thereby translating the optical trap in 3D (three dimensional).

15. The system as defined in claim 14 further adding a phase correction component for geometric aberrations.

16. The system as defined in claim 1 further including a subsystem for adjusting intensity variations of the light beam due to Gibbs phenomenon.

17. The system as defined in claim 1 wherein the hologram component decouples ring radius from topological charge.

18. The system as defined in claim 1 wherein the optical ring trap converges to a diffraction limited focus for $R>R_l$ where $R_l$ is radius of the optical ring trap.

19. The system as defined in claim 1 wherein the hologram component includes a superimpact single phase function on a conventional hologram, thereby creating an array of identical ring traps.

20. The system as defined in claim 19 further including a coupled dynamically reconfigurable microfluidic systems responsive to operation of the optical ring trap system.

* * * * *